United States Patent
Jamnia et al.

(10) Patent No.: US 7,165,450 B2
(45) Date of Patent: Jan. 23, 2007

(54) VARIABLE POSITION SENSOR EMPLOYING MAGNETIC FLUX AND HOUSING THEREFORE

(76) Inventors: Mohammad Ali Jamnia, 4642 N. Hermitage Ave., Chicago, IL (US) 60640; Jack Chen, 14 Kimberly Cir., Oak Brook, IL (US) 60521

( * ) Notice: Subject to any disclaimer, the term of this patent is extended or adjusted under 35 U.S.C. 154(b) by 137 days.

(21) Appl. No.: 10/883,155

(22) Filed: Jul. 1, 2004

(65) Prior Publication Data
US 2006/0000279 A1   Jan. 5, 2006

(51) Int. Cl.
*G01F 23/38* (2006.01)
(52) U.S. Cl. .......................................... 73/317
(58) Field of Classification Search ...................... None
See application file for complete search history.

(56) References Cited

U.S. PATENT DOCUMENTS

| | | | |
|---|---|---|---|
| 4,804,944 A | 2/1989 | Golladay | |
| 4,920,797 A | 5/1990 | Swartz | |
| 5,341,679 A * | 8/1994 | Walkowski et al. | 73/317 |
| 6,508,121 B2 | 1/2003 | Eck | |
| 6,679,116 B2 | 1/2004 | Ross, Jr. | |
| 6,734,667 B2 | 5/2004 | Lorenzen | |
| 6,813,946 B1 | 11/2004 | Benton | |
| 2003/0112004 A1* | 6/2003 | Luetzow | 324/207.13 |
| 2005/0103103 A1 | 5/2005 | Newman | |
| 2005/0109105 A1 | 5/2005 | Kowalski | |

* cited by examiner

*Primary Examiner*—Hezron Williams
*Assistant Examiner*—Paul M. West
(74) *Attorney, Agent, or Firm*—Robert L. Marsh (57) ABSTRACT

A fuel level sensor has a rotor with two magnets mounted for rotation therewith, the magnets spaced from one another and with like poles directed toward one another. A Hall effect sensor on the housing is positioned between the two magnets such that increasing the volume of fluid in the tank moves one magnet toward the sensor and decreasing the volume in the tank moves the other magnet toward the sensor. A metal sleeve around the magnets protects the parts from interference from magnetic material in the fuel. A static discharge path is provided from a metal rod connecting a float, a plate contracting the rod, and a pivot pin retaining the rotor to the housing, and a ground connector in contact with the pivot pin.

13 Claims, 9 Drawing Sheets

VARIABLE POSITION SENSOR EMPLOYING MAGNETIC FLUX AND HOUSING THEREFORE

The present invention relates to a fuel level detector, the parts of which are protected against the corrosive effects of the fuel.

BACKGROUND OF THE INVENTION

It is necessary to measure as accurately as possible, the level of fuel or the volume of fuel in a fuel tank of a vehicle. Typically, the fuel level or volume is measured by using a float connected to arm and a wiper for wiping a contact pattern on a variable resistor. The float moves with the level of the fuel and as the float moves, the arm causes the wiper to move across an arcuate wiper track changing the resistance of the resistor in response to changes in the level of the liquid or the volume in the tank.

The surfaces of the device used to measure the level of the fuel in a tank are subject to the corrosive effects of the chemicals that make up the fuel. Methanol is particularly corrosive. Over the course of time, the corrosion of critical elements will result in inaccuracies in the measurements taken. It would be desirable to provide a fuel sensor that would measure the level of fuel or the volume of fuel in a tank without subjecting the electronic parts needed to make the measurements to the corrosive effect of the chemicals in the fuel.

SUMMARY OF THE INVENTION

Briefly, the present invention is embodied in fuel sensing device having a pivot arm at the end of which is mounted a float that rises and falls with the level of fuel in the tank. The angular orientation of the pivot arm is therefore related to the level of the fuel in the tank.

In the preferred embodiment, the device includes a pair of approximately equal permanent magnets, each having a north pole and a south pole. A field formed by a plurality of continuous lines of a magnetic flux extends through the axis of each of the magnets between the north and south poles and forms a halo of continuous loops around the circumference of the magnet. The two magnets are mounted on a rigid member, with one of the poles of a first magnet pointed generally towards the pole of a second magnet where the poles that are directed towards each other have the same polarity. The member upon which the magnets are mounted may move with the float arm or may be mounted to the housing in which the float arm pivots. A magnetic flux sensor, typically a Hall effect sensor, is mounted on the other of the pivot arm and the housing and is positioned generally between the first and second magnets and is adapted to move toward the first magnet as the fuel level in the tank increases and move toward the second magnet as the fuel level in the tank decreases. The sensor issues a signal that is directional in response to the direction from which the magnetic flux originates and the strength of the signal is proportionate to the strength of the magnetic field passing through the sensor. The signal from the sensor can then be used to provide a measure of the elevation of the surface of the fuel in the tank.

Government regulations require that a vehicle fuel tank include a ground for discharging any static electricity buildup. In accordance with another feature of the invention, an electrostatic discharge path is provided whereby the metal float arm is grounded.

Specifically, an elongate metal float arm has one end attached to the float and a second end attached to a plastic rotor member which is retained by an electrically conductive pivot pin to a stationary housing member attached to the inner wall of the fuel tank. Extending along the outer surface of the rotor is a metallic member having a hole at one end through which the conductive pivot pin extends and a hole at the second end through which a portion of the metal float rod extends. Accordingly, the metallic member makes electrical contact with both the float rod end and the pivot pin, thereby providing an electrical path from the float arm to the pivot pin.

The opposite end of the pivot pin has an enlarged head which retains the pivot pin into the stationery housing member. Mounted on either the rotor or the housing is the pair of magnets oriented with like poles directed generally toward each other as described above. Mounted on the other of the rotor and housing is a Hall effect sensor for measuring the strength and direction of magnetic flux. When the first and second housing members are assembled to each other and retained together by the pin, the Hall effect sensor is positioned between the two magnets and moves toward one of the magnets as the float in the fuel tank rises and moves toward the second magnet as the float in the tank drops.

An inner housing member made of plastic surrounds the Hall effect sensor and any other electronics in the device and insulates the electrical components retained therein. Also molded into the housing is a lead frame, which includes a planar panel oriented perpendicular to the pivot pin and having a hole therethrough through which the pivot pin passes. The planar panel of the lead frame is formed at the end of an elongate strap that extends to the exterior of the housing where it can be attached by a wire to the body of the vehicle in which the tank is located. Since the second end of the pivot pin extends through the hole in the planar panel of the ground lead, the electrical contact between the plate, and the pin, thereby completing an electrical discharge path from the float arm to ground. It should be appreciated that the electrical discharge path described above will endure many years of wear and will not cause the premature failure of the fuel detecting device.

Modern vehicles provide fuel pumps located within the fuel tank that pump fuel from the tank to the engine in greater quantities than the engine can consume. Excess fuel not consumed by the engine is returned to the fuel tank. The movement of fuel around the parts of the engine causes small particles of metal from the engine to become suspended in the fuel. Where the particles are Ferrite, the particles will be attracted to the first and second magnets of the fuel level detector. To prohibit the presence of such particles of metal from interfering with the operation of the fuel level detector, an electrically conductive metallic shield in the form of a sleeve that at least partially encloses the first and second magnets and the sensor is provided. It is believed that the metal sleeve will obtain a magnetic charge from the neighboring magnets and that excess magnetically conductive particles in the fuel will be deposited on the outer surface of the housing. The movement of the fuel in the tank as the vehicle moves across ground will then wash away such accumulated metallic debris, such that the debris will not interfere with the operation of the fuel sensing device.

BRIEF DESCRIPTION OF THE DRAWINGS

A better understanding of the present invention will be had after a reading of the following detailed description taken in conjunction with the drawings wherein.

DETAILED DESCRIPTION OF A PREFERRED EMBODIMENT

Figure 1:
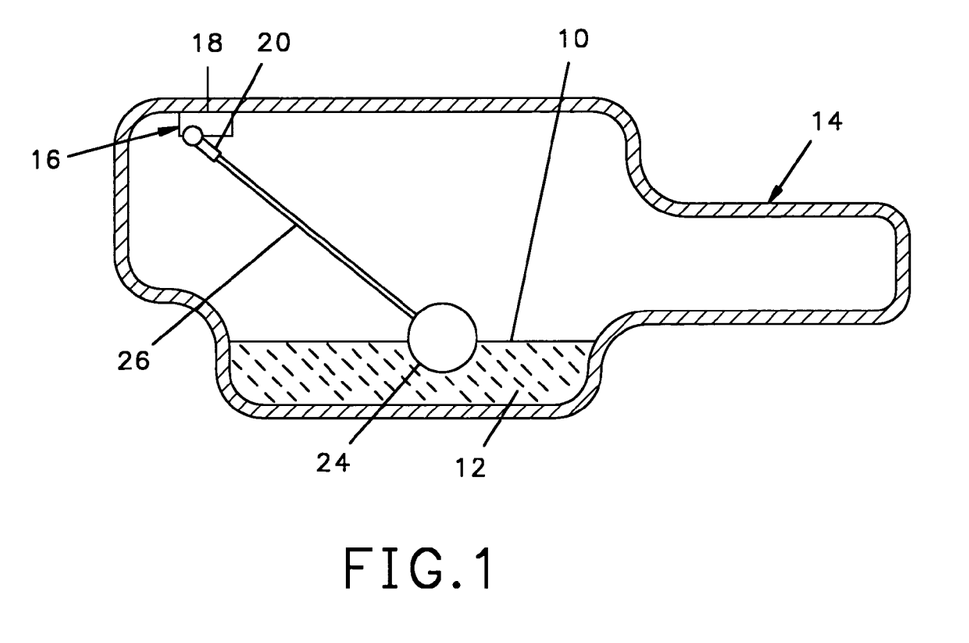
FIG. 1 is a cross-sectional view of a fuel tank having a fuel level detector therein in accordance with the invention.
Figure 2:
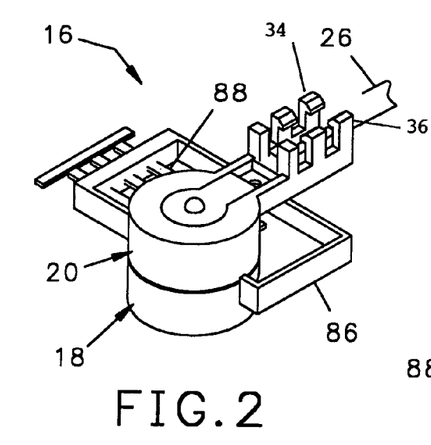
FIG. 2 is an isometric view of the fuel level detector shown in FIG. 2.

To measure the level 10 of fuel 12 in a tank 14 of a motor vehicle, not shown, a fuel level sensor 16 in accordance with the invention is provided that includes a stationary housing 18 and a rotor 20. The rotor 20 is rotated with respect to the housing by the movement of a float 24 attached to the rotor 20 by means of a rod 26.

It has been found that the rod 26 is preferably made of steel rather than plastic or wood, however, a steel rod 26 is subject to a static electricity built up along the surface thereof. Government regulations require that the liquid fuel in a fuel tank be grounded to prevent an electrostatic buildup. Fuel level sensors in accordance with the prior art employ a potentiometer including a resistor card and a moveable wiper to provide a signal that is responsive to the changes in the fuel level in the tank, and a second wiper was provided on such sensors for grounding the metal rod connecting the sensor to the float.

Referring to FIGS. 3, 5, and 7–10, the rotor 20 has a tubular central body 28 and across one outer end of the tubular central body 28 is a transverse end wall 30. Centrally located in the end wall 30 is a transverse hole 31. Extending radially outward of the central body 28 is an arm 32 and spaced along the length of the arm 32 are a plurality of pairs of opposing claws 34, 36, with each pair of claws 34, 36 spaced from each other a distance to compressively retain a portion of the rod 26 with the axis of the rod perpendicular to an axis 38 of the tubular central body 28. Between the central body 28 and the nearest pair of claws 34, 36 is a transverse hole 37 through the arm 32 sized to receive the distal end 39 of the rod 26 that has been bent ninety degrees. The rod 26 is assembled to the arm 32 by positioning the distal end 39 thereof into the hole 37 and snapping the length of the rod 26 between the pairs of claws 34, 36.

Mounted to the end wall 30 and within the tubular central body 28 are a pair of permanent magnets 40, 42 having north poles 40N, 42N and south poles 40S, 42S respectively. The magnets 40, 42 are positioned in the central body 28 on opposite sides of a Hall effect sensor 43 mounted on the housing 18, as is further described below. The ends of like poles, in this case the north poles 40N, 42N define planes 44, 45 and the planes 44, 45 are oriented at an angle 46 to one another that is approximately equal to the angle around which the rotor 20 is turned as the float 24 moves from a lowest level in which the tank in empty, to a highest level, in which the tank is full. Preferably, the angle 46 is between forty-five and ninety degrees. As can be seen, the like poles, in this case poles 40N and 42N, although set at an angle to one another, are none-the-less generally opposing to one another. The outermost lines of flux emanating from pole 40N will therefore oppose the outermost lines of flux emanating from pole 42N, such that a flux continuum exists between the two opposing like poles 40N, 42N.

Figure 3:
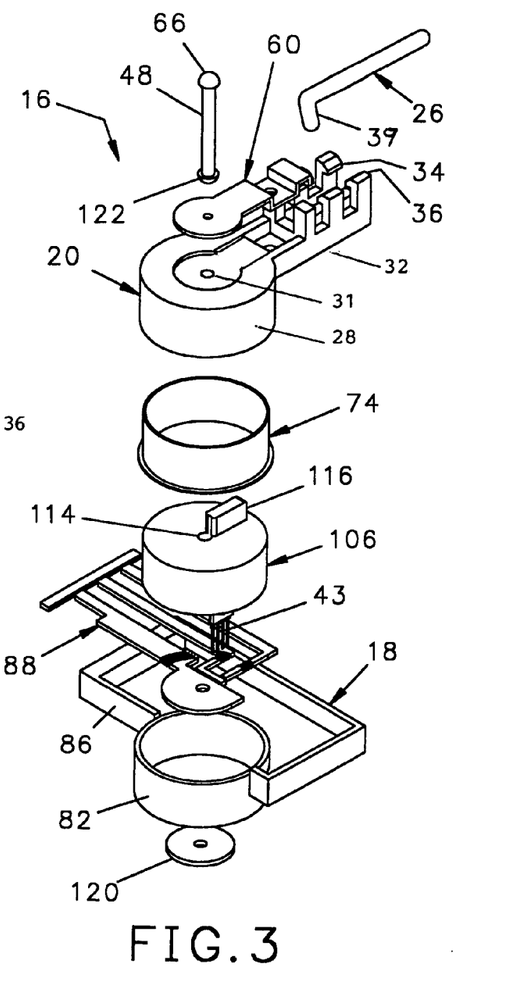
FIG. 3 is an exploded isometric view of the fuel level detector shown in FIG. 2.
Figure 4:
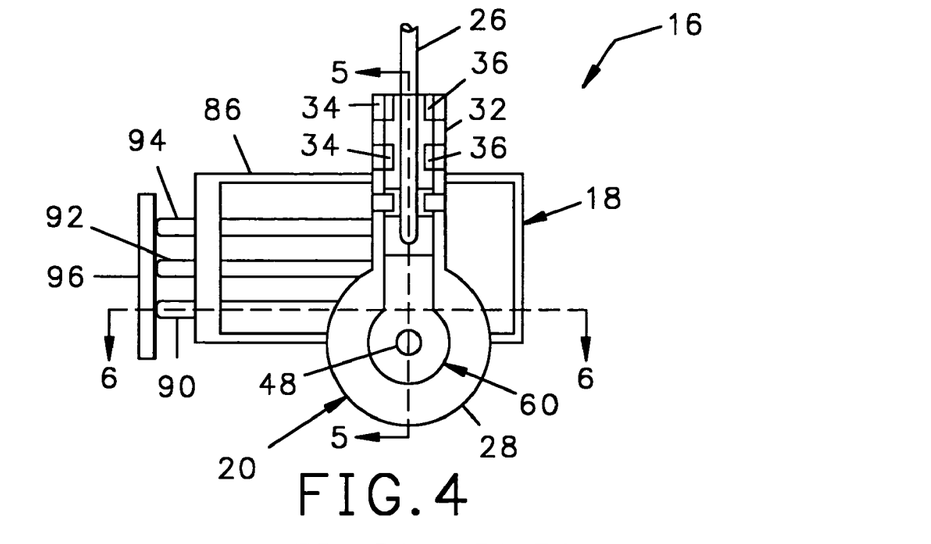
FIG. 4 is a top-elevational view of the fuel level detector shown in FIG. 2.
Figure 5:
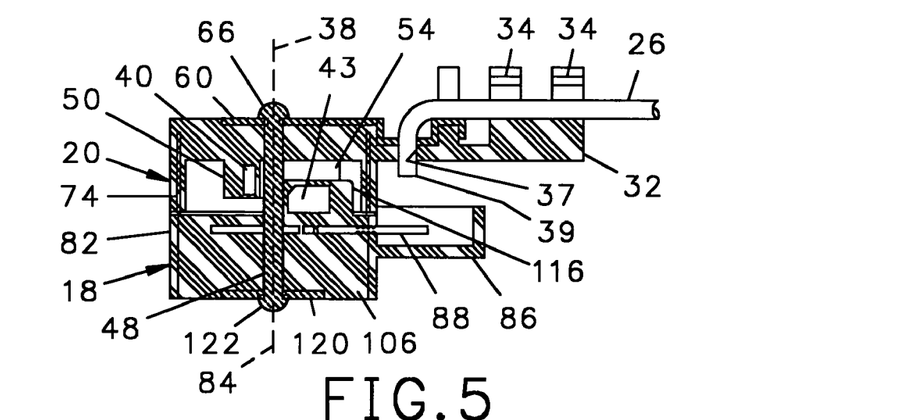
FIG. 5 is a cross-sectional view of the fuel level detector shown in FIG. 4 taken through line 5—5 thereof.

The poles 44, 45 of the ends of the permanent magnets 40, 42 intersect at a point 47 that is near the axis 38 of the tubular central body 28 but offset therefrom by a distance to permit a retaining pin 48 to extend through the transverse hole 32 and into portions of the stationary housing 18 as further described below, without interfering with an enclosure 50 that surrounds the permanent magnets 40, 42. The enclosure 50 has first and second surfaces 52, 54 each of which is adjacent to the one of the planes 44, 45 defining a face of the adjacent permanent magnet 40, 42. An arcuate space remains between the surfaces 52, 54 to receive the Hall effect sensor 43 mounted on the housing 18.

Figure 11:
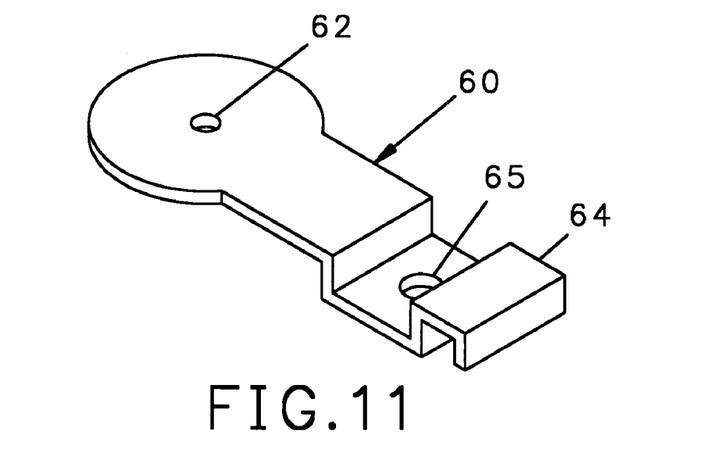
FIG. 11 is an isometric view of an ESD plate for use with the rotor shown in FIG. 7.
Figure 14:
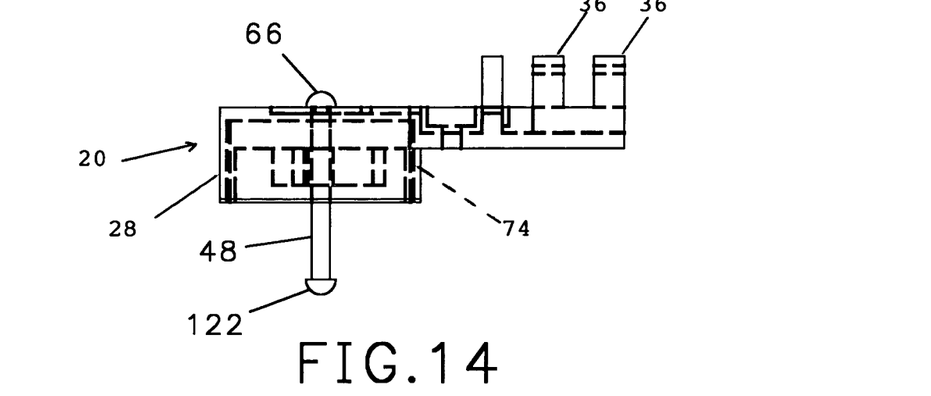
FIG. 14 is a side elevational view of the assembled rotor shown in FIG. 13 with the inner parts thereof shown in broken lines.
Figure 15:
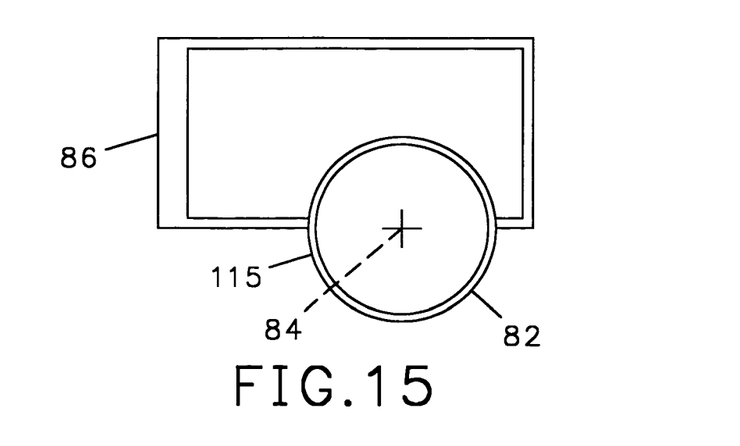
FIG. 15 is a front-elevational view of the stationary housing for the detector shown in FIG. 1.
Figure 16:
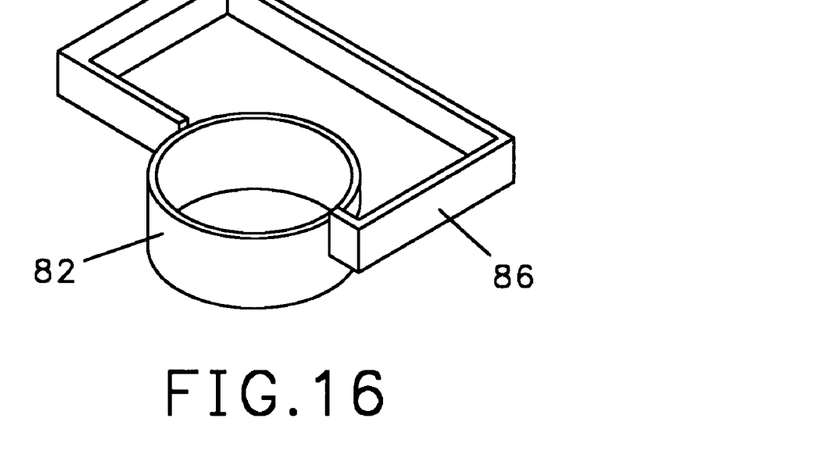
FIG. 16 is an isometric view of the housing shown in FIG. 15.
Figure 17:
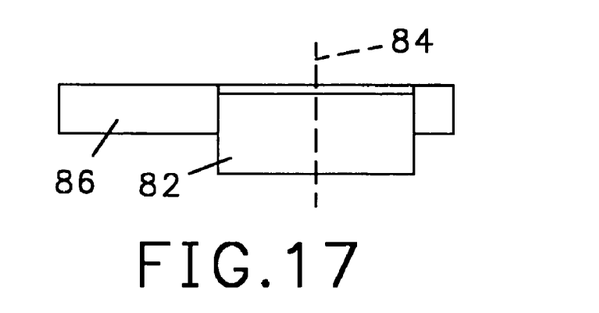
FIG. 17 is a side-elevational view of the housing shown in FIG. 15.
Figure 18:
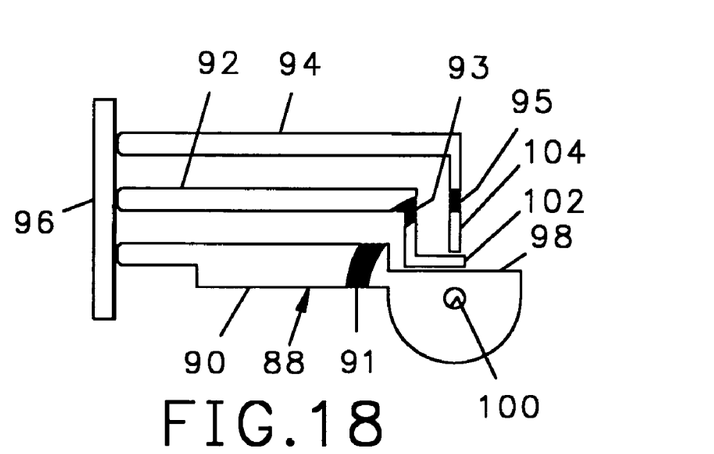
FIG. 18 is a front-elevational view of the lead frame for insertion into the housing shown in FIG. 15.

Referring to FIGS. 3, 11, and 14, fitted to the outer surface of the end wall 30 of the rotor 20 is a ground plate 60 having a generally rectangular body with a transverse hole 62 through a portion of one end thereof that is sufficiently large to slideably receive the retaining pin 48, and a crimped hook 64 at the opposite end thereof. The mid-portion of the ground plate 60 and the crimped hook 64 are shaped to conform to the outer surface of the arm 32. Near the hook end of the plate 60 is a second transverse hole 65 positioned coaxial with the hole 37 in the arm 32.

As best shown in FIG. 5, one end of the ground plate 60 is retained against the outer surface of the rotor 20 by the head 66 of the pin 48 and the other end thereof is retained by the bent distal end 39 of the rod 26 extending through a transverse hole 65 at the opposite end of the ground plate and then through the complementary hole 37 in the arm 32.

Figure 12:
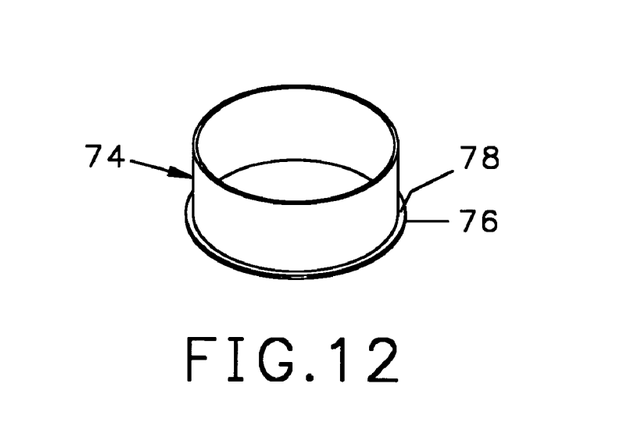
FIG. 12 is an isometric view of a steel collar for insertion into the cylindrical portion of the rotor shown in FIG. 7.
Figure 13:
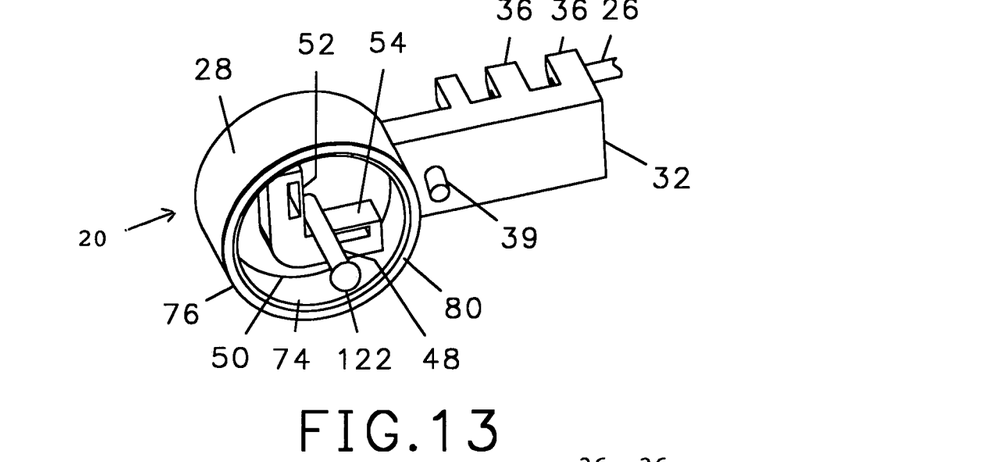
FIG. 13 is an isometric view of the assembled parts of the rotor.

Referring to FIGS. 12, 13, and 14, fitted into the cylindrical inner surface 72 of the tubular body 28 is a tubular steel collar 74 having at one end an outwardly extending radial flange 76. The outer surface of the steel collar 74 may be bonded to the inner surface 72 of the tubular central body 28. The steel collar 74 may also be molded into tubular central body 28 when it is formed as best shown in FIG. 14. The steel collar 74 has a radial flange 76 at one end thereof and an annular surface 78 of the radial flange 76 abuts against the distal end of the tubular central body 28.

Figure 6:
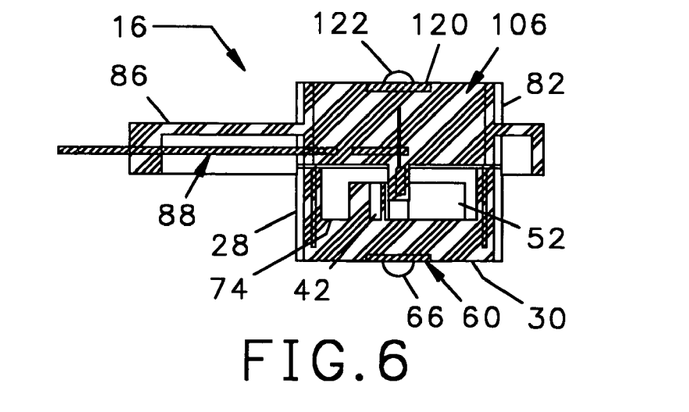
FIG. 6 is a cross-sectional view of the fuel level detector shown in FIG. 4 taken through line 6—6 thereof.
Figure 7:
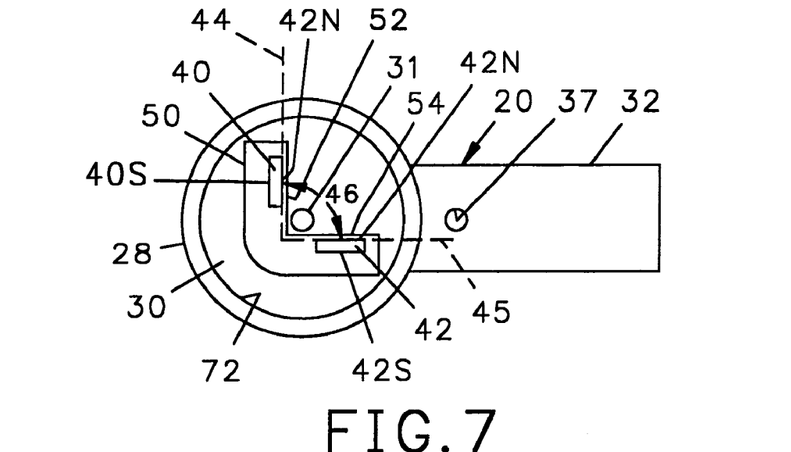
FIG. 7 is a front-elevational view of the rotor for the fuel level detector shown in FIG. 2.
Figure 8:
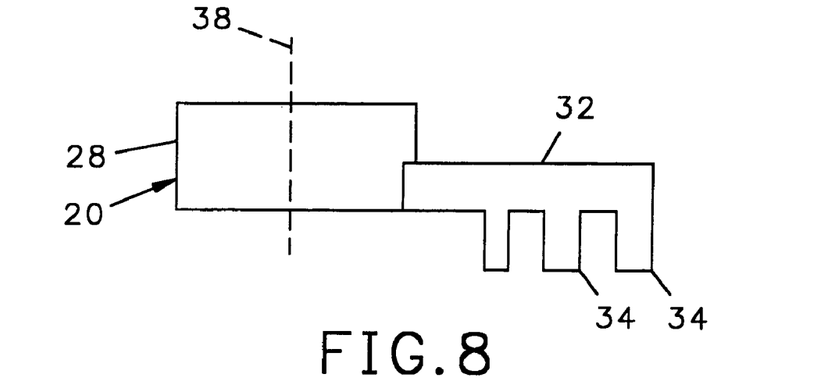
FIG. 8 is a side-elevational view of the rotor shown in FIG. 7.
Figure 9:
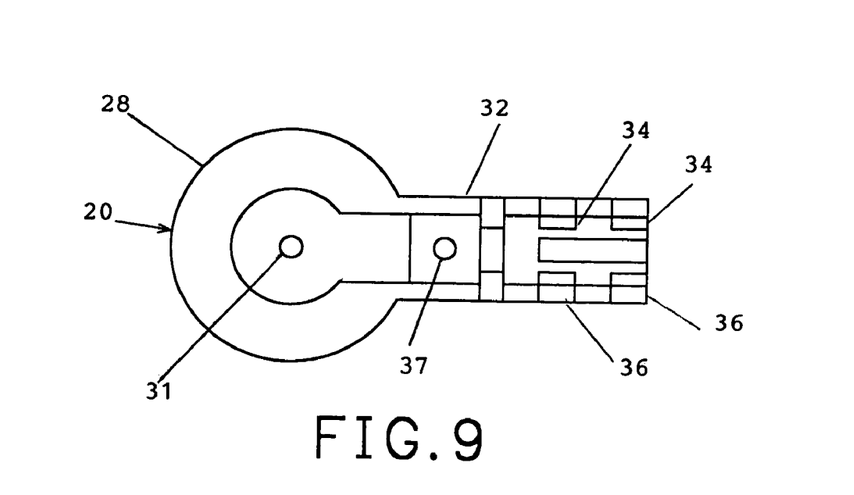
FIG. 9 is back-elevational view of the rotor shown in FIG. 7.
Figure 10:
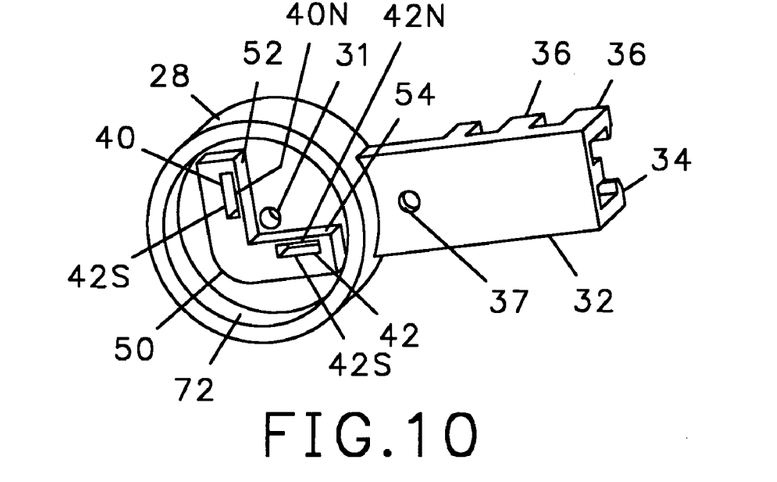
FIG. 10 is an isometric view of the rotor shown in FIG. 7.

Referring briefly to FIGS. 5, 6, and 13, the exposed planar annular surface 80 forms a bearing surface between the rotor 20 and the stationery housing 18.

Referring to FIGS. 3, and 15–19, the stationary housing 18 includes a tubular body 82 having a longitudinal axis 84 with the inner and outer diameters of the tubular body 82 being equal to the inner and outer diameters of the central body 28 of the rotor 20. Attached to the tubular body 82 is a generally rectangular frame 86. The tubular body 82 and the rectangular frame 86 are made of molded thermoplastic, and fitted into the mold so as to be bonded into the body 82 and frame 86 is a metal lead frame 88. Preferably, the lead frame 88 is made of a suitable metal to resist the corrosive effects of the fuel in the tank 14. The lead frame 88 includes a plurality of leads, of which three, 90, 92, 94 are depicted. To facilitate the molding process, the distal ends of the leads 90, 92, 94 are all retained together by a tie bar 96. The portions of the leads 90, 92, 94 have tortuous paths 91, 93, 95 stamped therein to prevent wicking of fuel once the leads are molded into the body of the housing 18 as is described below.

Figure 19:
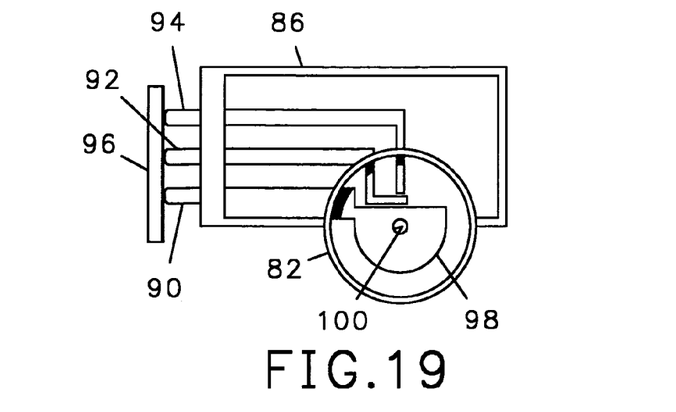
FIG. 19 is a front-elevational view showing the housing depicted in FIG. 15 with the lead frame depicted in FIG. 18 inserted therein.
Figure 20:
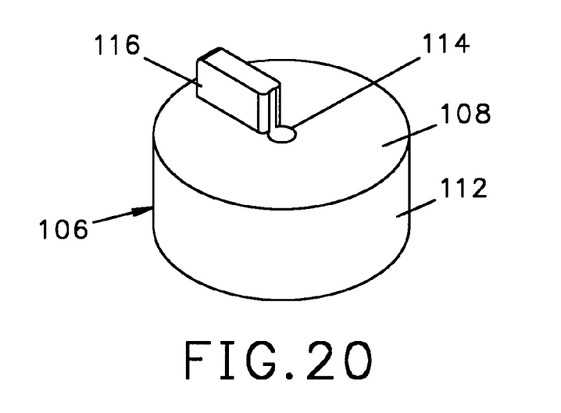
FIG. 20 is an isometric view of a housing for a detector for insertion into the housing shown in FIG. 15.
Figure 21:
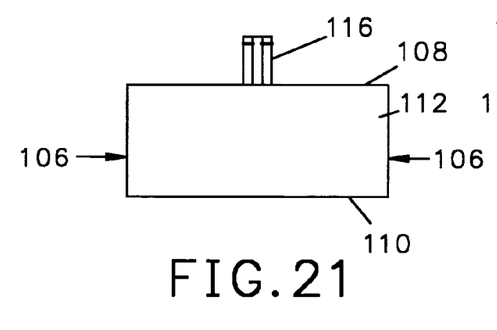
FIG. 21 is a side-elevational view of the housing shown in FIG. 20.
Figure 22:
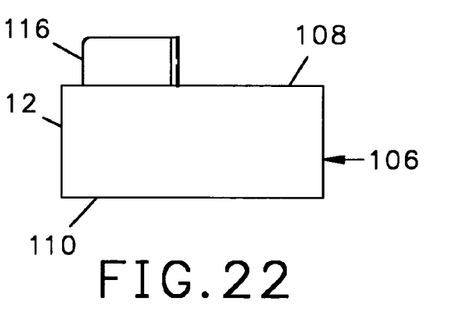
FIG. 22 is a second side view of the housing shown in FIG. 20.

The first lead 90 is a ground lead, and includes a generally planar pad 98 with a transverse hole 100 therein sized to receive the opposite end of the pin 48 extending from the rotor 20. As best seen in FIG. 19, the pad 98 has a semi-circular outer surface with the diameter thereof sufficiently small so as to reach the outer circumference of the tubular body 82. The pad 98 extends across only the central portion of the cross-sectional area of the tubular body 82 with the remaining portions of the cross-sectional area of the tubular body 82 accessible by the distal ends 102, 104 of the second and third leads 92, 94 respectively. Once the lead frame 88 has been molded into the body and frame 82, 88 of the housing 18, the tie bar 96 can be removed such that suitable connectors can be attached to the distal ends of the respective leads. 90, 92, 94.

Referring to FIGS. 3, 5, 6, and 20–22, inserted within the cylindrical opening of the tubular body 82 is an inner housing 106. The inner housing 106 has planar upper and lower surfaces 108, 110, a cylindrical outer wall 112 sized to fit within the cylindrical inner wall of the tubular body 82, and an axial hole 114 sized to receive the shaft of the pin 48. Extending from the forward surface 108 thereof, oriented radially outward of the hole 114 to a position near the outer wall is a protrusion 116 encapsulating the Hall effect sensor 43. The rearward surface 110 of the housing 106 has contact surfaces, not shown, which are connected to the electronics embedded within the housing 106, including the Hall effect sensor 43. When the housing 106 is bonded into the tubular body 82, the contact surfaces, not shown, are welded, or otherwise electrically connected to the distal ends 102, 104 of the leads 92, 94. Accordingly, the leads 92, 94 are connected to all the electronics, including the Hall effect sensor 43, in the housing 106. It should be appreciated that the electronics within the housing 106 may require more leads than the two 92, 94 depicted.

Referring to FIGS. 3 through 6, the rotor 20 is rotatably attached to the housing 18 by the pin 48 extending through the transverse holes 31, 62 of the rotor, the hole 100 of the lead frame, and the hole 114 of the housing 106 and secured therein by a washer 120 at the rearward end of the housing 18 and a second head 122 at the rearward end of the pin 48. When the parts are retained together by the pin 48, the annular rearward surface 80 of the collar 74 will rotate against the forward surface 115 of the housing body 82 thereby providing a bearing surface to ensure that the parts will endure for the useful life of the vehicle, not shown. Furthermore, with the metal pin 48 extending through the transverse hole 62 of the ground plate 60 and through the hole 100 of the lead frame, the ground plate 60, the pin 48, and ground lead 90 provide an electrostatic discharge path between the metal rod 26 and the ground lead 90 of the housing 18.

In addition to providing a wearing surface to facilitate rotation of the rotor 20 with respect to the housing 18, the steel collar 74 provides a steel barrier surrounding the permanent magnets 40, 42 and the Hall effect sensor 43. The magnetic fields created by the permanent magnets 40, 42 are enhanced by the steel collar 74 such that the steel collar 74 will magnetically attract any small particles of magnetically conductive material in the fuel 12 in the tank 14, thereby shielding the electronic components of the sensor 16 from interference from such small magnetically conductive particles. It is believed that such magnetically conductive particles will therefore collect on the outer surface of the central body 28 of the rotor 20 and be washed off by the movement of the liquid in the tank 14.

Figure 23:
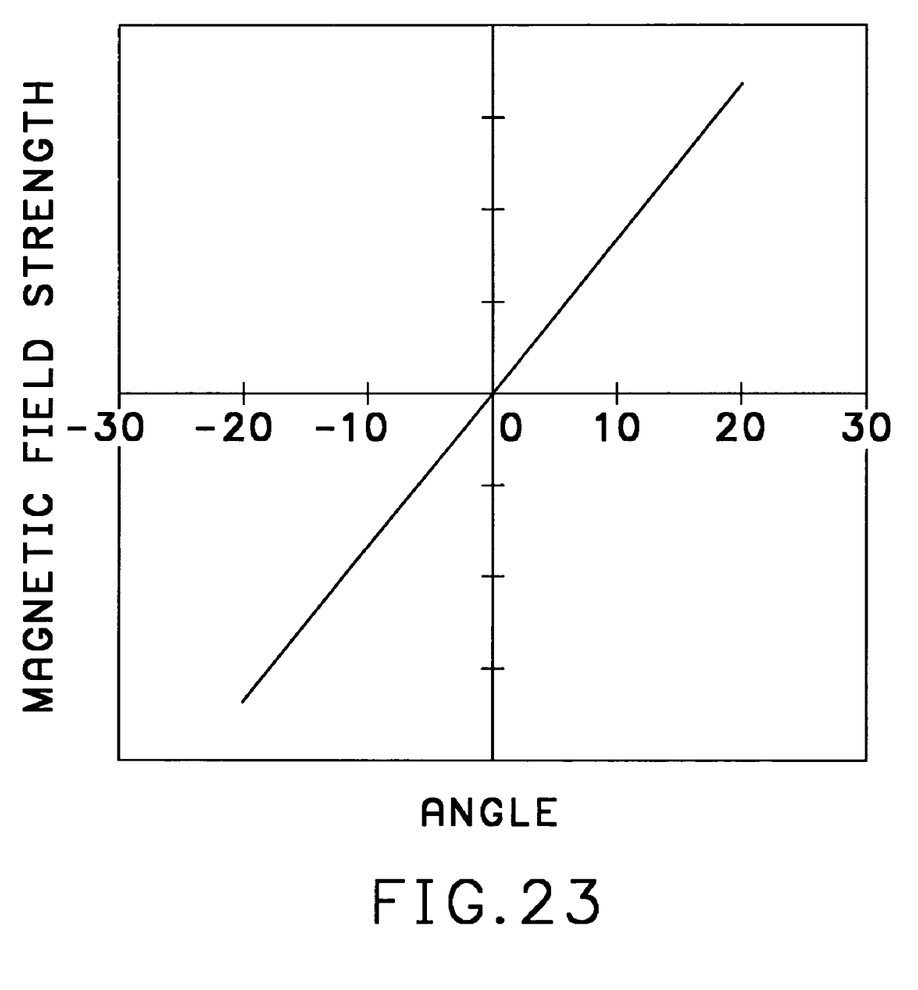
FIG. 23 is a graph showing the relationship of the angular orientation of the rotor to the housing, and the output of the Hall effect sensor.

Referring further to FIGS. 2–6, and 23, when the various parts are assembled together as described above, the protrusion 116 with the Hall effect sensor 43 therein will be positioned between the first and second surfaces 52, 54 of the enclosure 50 surrounding the permanent magnets 40, 42. The parts are oriented with respect to one another such that when the fuel tank 14 is empty and the float 24 resting on the bottom thereof, the rotor 20 will be moved to an extreme wherein the Hall effect sensor 43 will be positioned in near proximity to the first permanent magnet 40. On the other hand, when the tank 14 is full and the float 24 is near the top thereof, the orientation of the float 24 and rod 26 will cause the rotor 20 to be rotated such that the Hall effect sensor 43 is positioned near the second permanent magnet 42. Accordingly, upward or downward movement of the float 24 in response to changes in the surface level 10 of the fuel 12 in the tank 14 will cause the Hall effect sensor 43 to be moved towards the first permanent magnet 40 as the fuel level drops, and towards the second permanent magnet 42 as the fuel level rises. As best shown in FIG. 23, in the preferred embodiment, the output of the Hall effect sensor is a voltage, as shown, although it could be a current, that is direction sensitive and the output of which is linearly proportional to the changes in the elevation of the surface 10 of liquid in the tank 14. Accordingly, the output of the Hall effect sensor 43 is proportional to the surface level 10 the liquid 12 in the tank 14.

Another advantage of the present invention is that the housing 106 which contains the electronic components may be made using a transfer molding process. A transfer molding process does not require that the parts be heated to temperatures which would damage the electronic components that become embedded into the body thereof. The housing 106 can thereafter be bonded into the cylindrical inner wall of the tubular body 82 of the stationary housing 18. The stationary housing 18 can in turn be made using an injection molding process which is suitable for being molded around the lead frame 88.

While the present invention has been described with respect to a single embodiment, it will be appreciated that many modifications and variations may be made without departing from the true spirit and scope of the invention. It is therefore the intent of the appended claims to cover all such modifications and variations which fall within the spirit and scope of the invention.

What is claimed is:

1. A fuel sensing device for sensing the level of fuel in a tank comprising
    a first member and a second member,
    one of said first and second members attached to said tank,
    the other of said first and second members moveable with a surface level of fuel in said tank,
    a first and a second magnet on said first member wherein said first and second magnets are spaced from one another and like poles of said magnets are directed generally towards each other,
    a detector on said second member for detecting magnetic field strength,
    said detector positioned between said first and second magnets with a first spacing separating said detector from said first magnet and a second spacing separating said detector from said second magnet wherein said first spacing is increased as said fuel level rises and said second spacing is increased as said fuel level falls.

2. The fuel sensing device of claim 1 wherein one of said first and second members is a rotor and the other of said first and second members is a housing and said fuel level sensor further comprises
    a metal pin rotatably joining said rotor to said housing, and
    a static discharge path extending through said metal pin.

3. The fuel sensing device of claim 2 and further comprising a metal shield surrounding said means for detecting and said first and second magnets.

4. The fuel sensing device of claim 3 wherein said metal shield is a tubular sleeve having a flange at one end and
    said flange serves as a bearing surface between said rotor and said housing.

5. The fuel sensing device of claim 1 and further comprising a metal shield surrounding said detector and said first and second magnets.

6. A fuel level sensor comprising
    a housing,
    a rotor,
    a metal arm extending from said rotor,
    a metal pin rotatably joining said rotor to said housing,
    a pair of spaced magnets on one of said housing and said rotor,
    a detector on the other of said housing and said rotor for detecting field strength wherein a spacing between said detector and a first of said magnets is reduced as a level of fuel in said tank increases and a spacing between said detector and a second of said magnets is reduced as said level of fuel in said tank increases,
    a metal shield around said pair of meg nets and said detector, and
    a static discharge path passing through said pin.

7. A fuel level sensor for sensing a level of fuel in a tank, said fuel level sensor comprising
    a housing,
    a rotor,
    a magnet in one of said housing and said rotor,
    a detector on the other of said housing and said rotor for detecting magnetic field strength, and
    a metal shield around said magnet and said detector wherein said metal shield will enhance a magnetic field from said magnet and attract ferrite particles suspended in said fuel.

8. The fuel level sensor of claim 7 and further comprising
    a metal pin rotatably joining said rotor to said housing, and
    a static discharge path extending through said pin.

9. The fuel level sensor of claim 7 wherein said shield is a metal sleeve having a radial flange and said radial flange abuts a surface on one of said rotor and said housing to form a bearing surface between said rotor and said housing.

10. The fuel level sensor of claim 9 and further comprising
    a metal pin rotatably joining said rotor to said housing, and
    static discharge path extending through said pin.

11. A fuel level sensor comprising a plastic housing, a plastic rotor, a metal float arm, and a metal pin rotatably joining said rotor to said housing, and a static discharge path extending from said metal float arm and through said pin, a magnet, a magnetic field strength detector, and a metal shield around said magnet and said magnetic field strenath detector wherein said metal shield will enhance a magnetic field from said magnet and attract ferrite particles suspended in said fuel.

12. A position detector for detecting the position of a first object with respect to second object comprising
    a first member having a pair of spaced apart magnets mounted thereon,
    said spaced apart magnets having like poles directed towards one another,
    a second member having a Hall effect detector mounted thereon,
    said Hall effect detector positioned between said like poles of said spaced apart magnets, and
    means for connecting one of said first and second members to said first object,
    means for connecting another of said first and second members to said second object, and
    one of said first and second members moveable with respect to another of said first and second members wherein said Hall effect sensor is moveable toward one of said spaced apart magnets and away from another of said spaced apart magnets in response to movement of said first object with respect to said second object and said Hall effect sensor detects said movement of said first object with respect to said second object.

13. The position detector of claim 12 and further comprising
    readout means connected to said Hall effect sensor wherein a readout of said Hall effect sensor is related to said movement.

* * * * *

UNITED STATES PATENT AND TRADEMARK OFFICE
CERTIFICATE OF CORRECTION

PATENT NO. : 7,165,450 B2  Page 1 of 1
APPLICATION NO. : 10/883155
DATED : January 23, 2007
INVENTOR(S) : Mohammad Ali Jamnia and Jack Chen It is certified that error appears in the above-identified patent and that said Letters Patent is hereby corrected as shown below:

Column 2, Line 36 after "lead" delete "the electrical contact" and substitute --an electrical contact is made--

Column 7, Line 60 after "pair of" delete "meg nets" and substitute --magnets--

Column 8, Line 25, at the beginning of the line insert --a-- prior to "static discharge"

Signed and Sealed this

Fourth Day of March, 2008

JON W. DUDAS
*Director of the United States Patent and Trademark Office*